United States Patent
Frauen et al.

(10) Patent No.: US 9,868,549 B2
(45) Date of Patent: Jan. 16, 2018

(54) METHOD FOR THE ASSEMBLY OF AN AIRCRAFT FUSELAGE AND FUSELAGE MANUFACTURING STATION

(71) Applicant: Airbus Operations GmbH, Hamburg (DE)

(72) Inventors: Holger Frauen, Hamburg (DE); Robert Alexander Goehlich, Hamburg (DE)

(73) Assignee: Airbus Operations GmbH (DE)

( * ) Notice: Subject to any disclaimer, the term of this patent is extended or adjusted under 35 U.S.C. 154(b) by 225 days.

(21) Appl. No.: 14/490,929

(22) Filed: Sep. 19, 2014

(65) Prior Publication Data
US 2015/0083860 A1 Mar. 26, 2015

(30) Foreign Application Priority Data

Sep. 26, 2013 (DE) .................. 10 2013 110 684

(51) Int. Cl.
*B64C 1/26* (2006.01)
*B64F 5/00* (2017.01)
(Continued)

(52) U.S. Cl.
CPC ............ *B64F 5/0009* (2013.01); *B64C 1/068* (2013.01); *B64C 1/26* (2013.01); *B64F 5/10* (2017.01);
(Continued)

(58) Field of Classification Search
CPC .......... B64F 5/0009; B64C 1/068; B64C 1/26
See application file for complete search history.

(56) References Cited

U.S. PATENT DOCUMENTS

| | | | |
|---|---|---|---|
| 6,237,210 B1* | 5/2001 | Stoewer | .................... B64C 1/00 29/243.53 |
| 7,756,321 B2 | 7/2010 | Marsh et al. | |

(Continued)

FOREIGN PATENT DOCUMENTS

| | | |
|---|---|---|
| CN | 101583536 A | 11/2009 |
| CN | 101743163 A | 6/2010 |

(Continued)

OTHER PUBLICATIONS

Chinese Office Action dated Dec. 22, 2015.
European Search Report (14183037.2) dated Feb. 16, 2015.
DE 10 2013 110 684.6—German search report dated Jul. 30, 2014.

*Primary Examiner* — Justin M Benedik
(74) *Attorney, Agent, or Firm* — Lerner, David, Littenberg, Krumholz & Mentlik, LLP

(57) ABSTRACT

A method for the assembly of an aircraft fuselage, to a fuselage manufacturing station and to a construction kit includes providing a pre-assembled cockpit unit, a pre-assembled wing box, a pre-assembled tail unit and a plurality of pre-fabricated fuselage shell segments. Furthermore, the method involves positioning the cockpit unit, the wing box and the tail unit. Moreover, a first front fuselage shell segment is positioned on a front connecting region of the wing box, and a first rear fuselage shell segment is positioned on a rear connecting region of the wing box. The first front fuselage shell segment is joined to a second front fuselage shell segment, and the first rear fuselage shell segment is joined to a second rear fuselage shell segment. As a result of the above, following the assembly of the aircraft fuselage an aircraft fuselage can be provided that already comprises equipment elements or functional elements.

15 Claims, 6 Drawing Sheets

(51) Int. Cl.
*B64C 1/06* (2006.01)
*B64F 5/10* (2017.01)

(52) U.S. Cl.
CPC ....... *B23P 2700/01* (2013.01); *B64C 2211/00* (2013.01); *Y10T 29/49622* (2015.01); *Y10T 29/534* (2015.01)

(56) References Cited

U.S. PATENT DOCUMENTS

| | | | | |
|---|---|---|---|---|
| 2001/0054228 | A1* | 12/2001 | Lehmker | B21J 15/10 29/701 |
| 2006/0185143 | A1* | 8/2006 | Frauen | B23P 21/004 29/33 K |
| 2008/0205763 | A1 | 8/2008 | Marsh et al. | |
| 2009/0283509 | A1* | 11/2009 | Frauen | B23K 20/122 219/121.85 |
| 2010/0031509 | A1* | 2/2010 | Frauen | B64F 5/0009 29/897.2 |
| 2010/0133382 | A1* | 6/2010 | Pahl | B64C 3/22 244/120 |
| 2010/0192376 | A1* | 8/2010 | Frauen | B64F 5/0009 29/897.2 |
| 2011/0138603 | A1* | 6/2011 | Blees | B64F 5/00 29/429 |
| 2012/0186062 | A1* | 7/2012 | Vera Villares | B64C 1/069 29/428 |
| 2013/0277901 | A1* | 10/2013 | Moje | B64C 1/06 269/1 |

FOREIGN PATENT DOCUMENTS

| | | |
|---|---|---|
| DE | 198 34 703 C1 | 12/1999 |
| DE | 10 2005 054 869 A1 | 5/2007 |
| DE | 10 2007 028 918 A1 | 1/2009 |
| DE | 10 2008 038 806 A1 | 2/2010 |
| WO | 2007/057411 A1 | 5/2007 |

\* cited by examiner

9,868,549 B2

METHOD FOR THE ASSEMBLY OF AN AIRCRAFT FUSELAGE AND FUSELAGE MANUFACTURING STATION

FIELD OF THE INVENTION

The invention relates to a method for the assembly of an aircraft fuselage, to a fuselage manufacturing station for the assembly of an aircraft fuselage, and to a construction kit for the production of an aircraft fuselage.

BACKGROUND OF THE INVENTION

Nowadays, sectional construction is widely used in the construction of an aircraft fuselage. In this process it is usual to first produce fuselage segments, i.e. individual "fuselage barrels". These fuselage segments can subsequently be joined by means of circumferential transverse seams. In this arrangement individual sections of the aircraft fuselage can be constructed from stringers, frame elements and outer skin elements. In this arrangement the problem of tolerance compensation between individual fuselage segments or "fuselage barrels" can occur, wherein tolerance compensation requires compensation of minimum differences in the cross-sectional geometries of the individual fuselage segments.

After the fuselage segments have been produced and individual fuselage segments have already been interconnected, equipping and furnishing the aircraft fuselage can take place. In other words, it is possible, among other things, to install, in the aircraft fuselage, lines, pipes, electronics components, cables, insulation elements, dome-shaped pressure bulkheads and interior furnishing components.

In DE 10 2008 038 806 A1 and US 2011/0138603 A1 it is described that an aircraft structure and the aircraft cabin for the aircraft structure can be assembled independently of each other at different locations. Subsequently the aircraft cabin can be inserted into the already assembled aircraft structure.

In DE 10 2007 028 918 A1 a method for the production of a fuselage cell of an aircraft is described.

BRIEF SUMMARY OF THE INVENTION

A first aspect of the invention relates to a method for the assembly of an aircraft fuselage with a fuselage manufacturing station. In this arrangement the method comprises the step of providing a pre-assembled wing box comprising a front connecting region for connecting front fuselage shell segments, and a rear connecting region for connecting rear fuselage shell segments, a pre-assembled cockpit unit, a pre-assembled tail unit, and a plurality of pre-fabricated front and rear fuselage shell segments. Furthermore, the method comprises the steps of positioning the wing box, the cockpit unit and the tail unit in an assembly region of the fuselage manufacturing station, of positioning a first front fuselage shell segment on the front connecting region of the wing box, and of positioning a first rear fuselage shell segment on the rear connecting region of the wing box. Furthermore, the method involves the steps of joining the first front fuselage shell segment to a second front fuselage shell segment and of joining the first rear fuselage shell segment to a second rear fuselage shell segment.

In this arrangement the term "fuselage manufacturing station" can refer to a device or a facility for the assembly of an aircraft fuselage. The fuselage manufacturing station can comprise an assembly region for the aircraft fuselage, in which assembly region the entire aircraft fuselage can be assembled. In other words, in the assembly region adequate space can be provided for the assembly of an entire aircraft fuselage.

For the sake of simplicity hereinafter the term "aircraft fuselage" is used, although the method described can also be applied to other large components in the aerospace sector and elsewhere. For example, the method can be used in the production of space shuttles, space station modules, satellites or submarine hulls.

The steps of the method can be carried out in any desired order. For example, it is possible to first position the cockpit unit, the wing box and the tail unit relative to each other. Subsequently, the fuselage shell segments can be positioned in their corresponding assembly positions. Thereafter, the components can be interconnected. As an alternative it is possible to first position the wing box, and subsequently to position fuselage shell segments on the wing box. Thereafter, the cockpit unit and the tail unit can be positioned on the fuselage shell segments and can be connected to the aforesaid. However, other sequences of the method-related steps are also possible.

In the context of this patent application the term "component" refers to a component of the aircraft fuselage. For example, the pre-assembled wing box, the pre-assembled cockpit, the pre-assembled tail unit and the pre-fabricated fuselage shell segments can generally be referred to as "components".

In the context of this patent application the term "pre-fabricated" can denote that the pre-fabricated component contains at least one element from the group comprising surface protection, insulation, mounting devices, electrical components, sensor components, electronics components, hydraulics components, fiber optic lines, wireless modules, air conditioning components, fuel components, bleed-air components, fuel cell components, auxiliary power units or electricity generating units, windows, doors, cargo space doors and any combination thereof. A "pre-equipped" component can comprise an element from the group comprising lining elements, interior fitting components, lavatories, galleys, hatracks, carpets, seats and any combination thereof.

In this arrangement these definitions of "pre-fabricated" and "pre-quipped" can relate to the cockpit unit, the wing box, the tail unit, to the fuselage shell segments, to the floor structure and/or to other components.

In one step of the method pre-assembled or pre-fabricated components of the aircraft fuselage are provided. One of these components is a pre-assembled wing box or center wing box that can comprise connection elements for wings of the aircraft. The term "pre-assembled" can denote that the wing box, the cockpit unit and/or the tail unit in the circumferential direction of the aircraft fuselage already comprises part of the structure of the fuselage. In other words the wing box, the cockpit unit and/or the tail unit can be provided in the form of a barrel. Furthermore, the wing box, the cockpit unit and/or the tail unit can comprise a floor grid with or without floor panels. Furthermore, the pre-assembled wing box, the cockpit unit and/or the tail unit can be pre-fabricated and/or pre-equipped. For example, a monument e.g. a lavatory or a galley can be preinstalled. The monument can also be temporarily parked in the wing box, in the cockpit unit and/or in the tail unit and can be installed in its final position following assembly of the fuselage. Furthermore, the pre-assembled wing box, the cockpit unit and/or the tail unit can comprise an aircraft door and/or aircraft windows. It is also possible for excess cable lengths to be contained in the wing box, in the cockpit unit and/or in the tail unit. Following assembly of the fuselage structure the excess cable lengths can be laid in the entire fuselage or in part of the fuselage. The excess cable lengths, which can, for example, be provided in the wing box, in the cockpit unit or in the tail unit, can, for example, in the corresponding unit already be connected to a corresponding electronics component and can be provided rolled up on a cable reel. It is also possible for fiber optic lines to be provided in the wing box, in the tail unit and/or in the cockpit unit. These fiber optic lines can also be provided rolled up on a cable reel.

Furthermore, the pre-assembled tail unit can comprise connecting regions on which horizontal stabilizers and vertical stabilizers can be installed. It is, for example, also possible for an element to be provided in the pre-assembled tail unit, which element is selected from the group comprising a trim spindle.

For example, the tail unit can comprise a pressure bulkhead. In this arrangement the pressure bulkhead can be contained in the structure of the tail unit. In front of the pressure bulkhead, i.e. in the direction of the cockpit, a cabin part of the tail unit can be provided. In this arrangement the cabin part can be pre-fabricated and pre-quipped. The outer part of the tail unit, which outer part is delimited by the pressure bulkhead, can be pre-fabricated. Furthermore, it is possible to provide trim spindles, fire protection systems and/or electricity generating units in the outer part of the tail unit, which outer part is delimited by the pressure bulkhead.

In this arrangement the wings can already be installed on the wing box. Likewise, the horizontal stabilizers and vertical stabilizers can already be installed on the tail unit. As an alternative, it is possible for the wings or horizontal stabilizers and vertical stabilizers to not yet be installed on the wing box or on the tail unit. In this case the wings or the horizontal stabilizers and vertical stabilizers can be installed after assembly of the aircraft fuselage.

The pre-assembled cockpit unit may comprise surface protection, insulation, mounting devices, electrical components, sensor components, electronics components, hydraulics components, fiber optic lines, air conditioning components, windows, avionics systems, an electronics bay, computers and radar. Preferably, the pre-assembled tail unit comprises surface protection, insulation, mounting devices, electrical components, sensor components, electronics components, hydraulics components, fiber optic lines, air conditioning components, trim spindles, fire protection sensors and/or fire protection systems and electricity generating units. Preferably, the pre-assembled wing box comprises surface protection, insulation, mounting devices, electrical components, sensor components, electronics components, hydraulics components, fiber optic lines and air conditioning components. Preferably, a pre-assembled fuselage shell segment comprises surface protection, insulation, mounting devices, lines and/or pipes, air conditioning components.

The pre-fabricated fuselage shell segments can be provided in the form of half-shells or quarter-shells. Furthermore, other shell arrangements are also possible so that the fuselage, for example in the circumferential direction, is constructed from two, three, four, five, six or more shells. In this arrangement the fuselage shell segments are provided in a pre-fabricated state. This may mean that the fuselage shell segments already comprise insulation devices, lines and pipes, cable holders, interior fitting components or similar. For example, the cables of the individual fuselage shell segments can comprise plug-in connections. Following assembly of the fuselage shell segments the cables of the individual fuselage shell segments can be interconnected by means of the plug-in connections. Furthermore, the fuselage shell segments can already comprise structural components such as stringers and frame elements.

Furthermore, in each case antennae can be provided on the fuselage shell segments and/or on the wing box. For example, antennae for satellite communications can be arranged in upper fuselage shell segments or in an upper region of the wing box.

The fuselage shell segments can be completely or at least partly equipped or furnished prior to the assembly of the fuselage. Consequently, furnishing or equipping can take place on the individual fuselage shell segments that have not yet been installed. In this manner the ergonomics and accessibility for equipping or furnishing can be improved. Furthermore, any equipping or furnishing at locations that are difficult to reach can be avoided.

In this arrangement front fuselage shell segments refer to fuselage shell segments that are designed to be attached in front of the wing box, while rear fuselage shell segments refer to fuselage shell segments that are designed to be attached behind the wing box. In other words, front fuselage shell segments can be arranged between the cockpit and the wing box, while rear fuselage shell segments can be arranged between the tail unit and the wing box.

In this arrangement the length of the fuselage shell segments can be variable. Thus, for example by varying the lengths of the fuselage shell segments it is possible to produce different fuselage lengths. By varying the lengths of the fuselage shell segments various family members of a product family can be produced.

The fuselage shell segments can be made from different materials. For example, the fuselage shell segments can comprise aluminum, composite materials, or a combination of these.

Because fuselage shell segments are connected to a pre-assembled wing box, to a pre-assembled cockpit unit and/or to a pre-assembled tail unit it is possible to compensate for differences in the radii between the cockpit unit, the wing box and the tail unit. In other words, in this method it is not necessary to interconnect "barrels" which could render any tolerance compensation more difficult. Instead, fuselage shell segments are connected to the cockpit unit, the tail unit and/or the wing box. Consequently it is possible in a simple manner to achieve tolerance compensation between the cockpit unit, the tail unit and/or the wing box.

In the context of this patent application the term "connecting" a first component to a second component can refer to connecting the first component to the second component and/or to attaching the first component to the second component. In this arrangement, connecting or attaching in the context of the patent application can in each case refer to welding, riveting, bonding and/or plugging together the respective components. When connecting the first front fuselage shell segment to a second front fuselage shell segment, and when connecting the rear fuselage shell segment to a second rear fuselage shell segment in each case the first and the second fuselage shell segments can be attached to each other. Connecting the first fuselage shell segment and the second fuselage shell segment can take place in the form of a longitudinal connection and/or a longitudinal seam relative to the longitudinal direction of the aircraft fuselage.

The term positioning the respective fuselage shell segment on the corresponding connecting region of the wing box can mean that the fuselage shell segments are transported to the wing box and are subsequently positioned in an assembly position on the corresponding connecting region of the wing box. This can, for example, take place by means of automatically controlled positioning devices of the manufacturing station.

When positioning the cockpit on an adjacent front fuselage shell segment, for example the cockpit can be positioned on the first front fuselage shell segment. The cockpit can also be positioned on another front fuselage shell segment. For example, a further front fuselage shell segment can be connected to the first front fuselage shell segment, and the cockpit can be positioned on this further front fuselage shell segment. Likewise, the tail unit can be positioned on the first rear fuselage shell segment or on a further rear fuselage shell segment that is connected to the first rear fuselage shell segment.

Because the fuselage shell segments are already pre-fabricated, following assembly of the aircraft fuselage, part of the equipment and/or furnishing of the aircraft fuselage is installed in the aircraft fuselage following assembly of the fuselage structure. This means that this part of the equipment or furnishing of the aircraft fuselage does not subsequently have to be installed in the aircraft fuselage. For this reason no additional installation step is required in which the already pre-installed equipment elements and/or functional elements are installed. Therefore, with the manufacturing station according to the invention or with the method according to the invention, assembly of the aircraft fuselage may take up less effort in time and/or work, or the throughput time of the aircraft can be reduced. Therefore, fewer installation personnel may be required for the assembly of the aircraft fuselage. Furthermore, by providing pre-fabricated and/or pre-furnished components it can be ensured that the equipment elements or functional elements are in fact installed. Furthermore, the assembly positions of the equipment elements or functional elements on the components may be predetermined so that errors during installation of the components can be minimized.

According to one embodiment of the invention, the method comprises the steps of joining the first and the second front fuselage shell segment to the front connecting region of the wing box, of joining the cockpit unit to an adjacent front fuselage shell segment, of joining the first and the second rear fuselage shell segment to the rear connecting region of the wing box, and of joining the tail unit to an adjacent rear fuselage shell segment.

For example, in this manner it is possible to establish transverse connections between the fuselage shell segments and the wing box or between the fuselage shell segments and the tail unit or the cockpit unit. These transverse connections can be connections that extend in the circumferential direction of the fuselage.

In this manner the fuselage shell segments can be connected to the wing box, the cockpit unit and the tail unit. Consequently, force transmission from the fuselage shell segments to the wing box, the cockpit unit or the tail unit can be made possible.

According to a further exemplary embodiment the method comprises the steps of positioning a front floor structure on the front connecting region of the wing box, positioning a rear floor structure on the rear connecting region of the wing box, joining the front floor structure to a front fuselage shell segment, and joining the second floor structure to a rear fuselage shell segment.

In this arrangement the floor structure can be pre-fabricated. Consequently, the floor can comprise pre-fabricated elements that are described in the context of the pre-fabricated fuselage shell segments. As a result of the aforesaid the assembled aircraft fuselage already comprises a floor structure.

According to a further exemplary embodiment the method comprises the steps of positioning the second front fuselage shell segment, a third front fuselage shell segment and a fourth front fuselage shell segment on the front connecting region of the wing box, and of positioning the second rear fuselage shell segment, a third rear fuselage shell segment and a fourth rear fuselage shell segment on the rear connecting region of the wing box. Furthermore, the method comprises the steps of joining the front fuselage shell segments to adjacent front fuselage shell segments, joining the front fuselage shell segments to the wing box and to the cockpit unit, joining the rear fuselage shell segments to adjacent rear fuselage shell segments, and joining the rear fuselage shell segments to the wing box and to the tail unit. In this arrangement the first front fuselage shell segment and the first rear fuselage shell segment are in each case lower fuselage shell segments. The second front fuselage shell segment and the third front fuselage shell segment, and the second rear fuselage shell segment and the third rear fuselage shell segment are in each case lateral fuselage shell segments. The fourth front fuselage shell segment and the fourth rear fuselage shell segment are in each case upper fuselage shell segments.

As a result of the aforesaid the aircraft fuselage in front of the wing box and behind the wing box can in each case be manufactured in a four-shell construction.

As a result of the aforesaid the aircraft fuselage can be manufactured with relatively few components. The four fuselage shell segments can be interconnected by means of four seams. In four-shell construction it is also possible for good tolerance compensation to be taking place by way of the four seams. At the stage of pre-fabrication or pre-furnishing of the fuselage shell segments the individual fuselage shell segments can, furthermore, be easily accessible. Furthermore, the positioning effort can be relatively modest. Moreover, little tooling effort may be required.

The lower fuselage shell segment can comprise a cargo floor. Furthermore, parts of the cargo floor can be provided on the lateral fuselage shell segments.

According to a further embodiment of the invention, the first front fuselage shell segment and the first rear fuselage shell segment are in each case lower fuselage shell segments, while the second front fuselage shell segment and the second rear fuselage shell segment are in each case upper fuselage shell segments.

In other words, in this manner the aircraft fuselage can be manufactured from two half-barrels. In this arrangement in the lower fuselage shell segment or in the lower half-barrel a floor grid and/or a cargo floor below the floor grid can already be provided. In this arrangement the floor grid can already contain floor panels. Alternatively, it is also possible to provide an assembly floor that at a later stage will be replaced by a floor grid.

In this manner the aircraft fuselage can be manufactured in a two-shell construction.

The advantages mentioned in the context of the four-shell construction also apply to the two-shell construction. Furthermore, it is also possible for the floor grid to be contained already in the pre-fabricated fuselage shell segments. Furthermore, in the two-shell construction the positioning effort or the tooling effort can be further reduced because in the two-shell construction the fuselage is constructed from fewer fuselage shell segments.

According to a further exemplary embodiment each step of joining involves welding, friction welding, riveting, bonding, plugging together, screwing or a combination According to a further exemplary embodiment, for accommodating the aircraft fuselage the assembly space comprises an elongated design, wherein on a front end of the assembly region a front pickup region is arranged, and/or on a rear end of the assembly region a rear pickup region are/is arranged for picking up components of the fuselage that are to be installed. In this arrangement the transport and positioning device is designed for transporting components from the front pickup region and/or from the rear pickup region to the assembly region.

In other words, components that are to be installed can be positioned in a pickup region. Subsequently, the fuselage manufacturing station can transport the corresponding component from the pickup region to the assembly region. This can, for example, take place fully automatically or semi-automatically.

In this manner the fuselage manufacturing station can, for example, be divided into various regions. For example, during transporting of components from a pickup region to the assembly region any access for persons to the assembly region can be blocked so that during transporting the components to the assembly region no persons can be injured. In this manner safety during the assembly of the aircraft fuselage can be ensured.

According to a further exemplary embodiment, for accommodating an aircraft fuselage the assembly space is elongated in a longitudinal direction and comprises a left-hand delimitation and a right-hand delimitation which are arranged so as to be parallel to the longitudinal direction. In this arrangement a left-hand transport and positioning device and a left-hand joining device are arranged on the left-hand delimitation of the assembly space, and a right-hand transport and positioning device and a right-hand joining device are arranged on the right-hand delimitation of the assembly space so that the aircraft fuselage can be assembled simultaneously from the left-hand side and from the right-hand side.

In other words, the aircraft fuselage can be processed from both sides. In this arrangement the transport and positioning device and the joining device can be designed as robot arms. In this manner all or almost all the positions on the aircraft fuselage can be reachable to the transport and positioning device and to the joining device.

According to a further exemplary embodiment the fuselage manufacturing station comprises an upper transport and positioning device for transporting a floor structure. In this arrangement the upper transport and positioning device is designed for positioning a front floor structure on the front connecting region of the wing box. Furthermore, the upper transport and positioning device is designed for transporting a rear floor structure on the rear connecting region of the wing box. In this arrangement the joining device is designed for joining the front floor structure to a front fuselage shell segment, and the joining device is designed for joining the rear floor structure to a rear fuselage shell segment.

As a result of the aforesaid, it is also possible to transport and position the floor structure by means of the fuselage manufacturing station.

According to a further exemplary embodiment of the invention, the transport and positioning device and the joining device are designed in the form of a multifunctional robot. The upper transport and positioning device is designed as a gantry crane.

For example, the transport and positioning device and the joining device can both be integrated in the same multifunctional robot. As a result of the aforesaid, transporting, positioning and joining the components can take place semi-automatically or fully automatically.

A further aspect of the invention relates to a construction kit for the production of an aircraft fuselage, which construction kit provides the components required to implement the method, comprising a pre-assembled cockpit unit comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, lavatories, galleys, hatracks, carpets, seats, auxiliary power units and any combination thereof; and/or a pre-assembled wing box comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, lavatories, galleys, hatracks, carpets, seats, auxiliary power units and any combination thereof; and/or a pre-assembled tail unit comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, lavatories, galleys, hatracks, carpets, seats, auxiliary power units and any combination thereof; and a plurality of separate, pre-fabricated, fuselage shell segments, a pre-fabricated fuselage shell segment in each case comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, hatracks, auxiliary power units and any combination thereof.

As a result of the aforesaid, a construction kit for an aircraft fuselage is provided, which construction kit already comprises equipment elements and/or functional elements. In this manner the aircraft fuselage, which is assembled from the construction kit according to the aspect of the invention, can already contain equipment elements and/or functional elements. Thus, after assembly of the aircraft fuselage the equipment elements contained in the construction kit can already be installed. As a result of the aforesaid, the effort relating to the assembly of the aircraft fuselage can be reduced.

Furthermore, characteristics and advantages that have been described in the context of the method and of the fuselage manufacturing station can also be transferred to the construction kit.

The embodiments described above and below equally apply to a method, to a fuselage manufacturing station and to a construction kit for the production of an aircraft fuselage, although individual embodiments are exclusively described in the context of a method of a fuselage manufacturing station or of a construction kit. Synergy effects can result from various combinations of the embodiments, even if these effects are not described below.

Further characteristics, advantages and application options of the invention are disclosed in the following description of the exemplary embodiments and of the figures. In this arrangement all the described and/or illustrated characteristics per se and in any combination form the subject of the invention, even irrespective of their composition in the individual claims or their interrelationships.

BRIEF DESCRIPTION OF THE DRAWINGS

The figures are diagrammatic and not to scale. If in the following description in various figures the same reference characters are stated, they designate identical or similar elements. However, identical or similar elements can also be designated by different reference characters.

DETAILED DESCRIPTION

Figure 1:
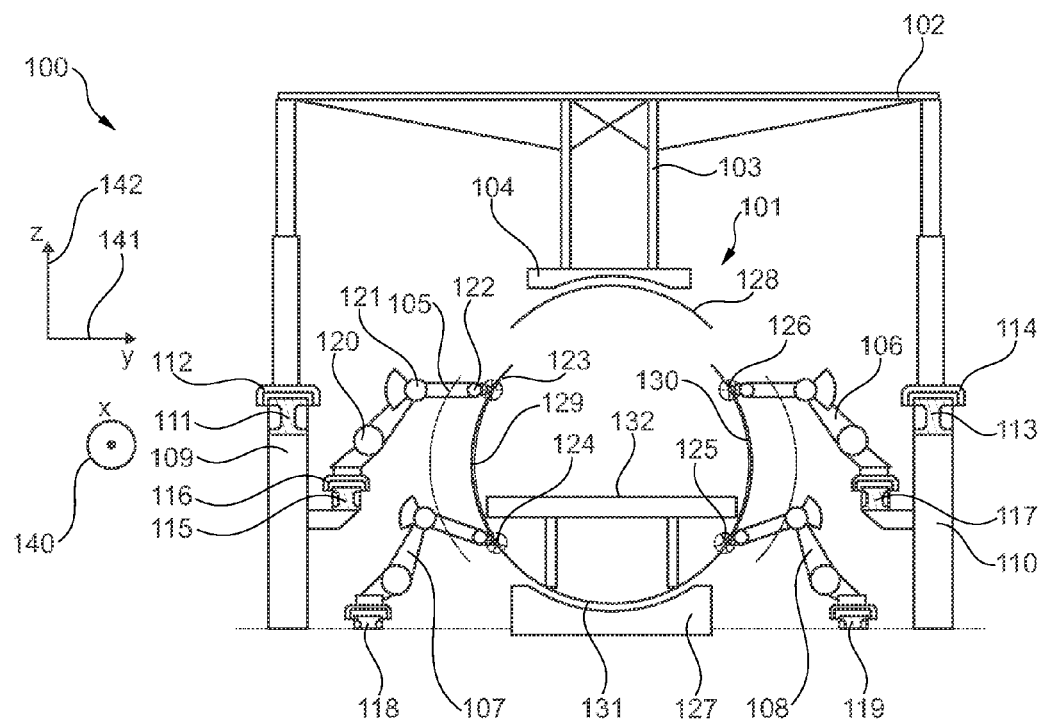
FIG. 1 shows a fuselage manufacturing station according to an exemplary embodiment of the invention.

FIG. 1 shows a cross section of a fuselage manufacturing station 100 according to one exemplary embodiment of the invention. In this arrangement the fuselage manufacturing station 100 is designed for the assembly of an aircraft fuselage 101. The longitudinal direction of the aircraft fuselage or the longitudinal direction of the respective component of the aircraft fuselage is arranged along the X-direction 140. Furthermore, the Y-direction 141 denotes a horizontal direction perpendicular to the X-direction. The Z-direction 142 denotes the vertical direction.

The fuselage manufacturing station 100 comprises a gantry crane 102 that has a lifting mechanism 103 on whose end a holding tool and/or a gripping tool 104 is attached. By means of the gantry crane it is possible to transport and position various components of the aircraft fuselage. For example, by means of the gantry crane an upper fuselage shell segment 128 or a floor structure 132 can be transported and positioned. In this arrangement the gantry crane 102 can be moved along two rails 111 and 113. For this purpose a guiding element 112 of the gantry crane 102 is attached to the rail 111, and a guiding element 114 of the gantry crane 102 is attached to the rail 113. The rails 111 and 113 are attached to the supports 109 and 110.

Furthermore, the fuselage manufacturing station 100 comprises several robot arms 105, 106, 107 and 108 by means of which it is possible to transport and position components of the aircraft fuselage. In this arrangement the left-hand robot arms 105 and 107 can transport and position components of the left-hand side of the fuselage, and the right-hand robot arms 106 and 108 can transport and position components of the right-hand side of the fuselage. For example, by means of the robot arms 105 and 107 a left-hand fuselage shell segment 129 can be transported and positioned, and by means of the robot arms 106 and 108 a right-hand fuselage shell segment 130 can be transported and positioned. In this arrangement the robot arms 105, 106, 107 and 108 can also be displaced in the X-direction 140. For this purpose the robot arm 105 can be displaced along a rail 115 by means of a guiding element 116, the robot arm 106 can be displaced along a rail 117, the robot arm 107 can be displaced along a rail 118, and the robot arm 108 can be displaced along a rail 119. The rail 115 is attached to the support 109, and the rail 117 is attached to the support 110. The rails 118 and 119 are in each case attached to the floor of the fuselage manufacturing station. For the purpose of holding and/or gripping the components to be transported or to be installed, a holding or gripping tool 123 is attached to the robot arm 105, a holding or gripping tool 126 is attached to the robot arm 106, a holding or gripping tool 124 is attached to the robot arm 107, and a holding or gripping tool 125 is attached to the robot arm 108. In each case the robot arms can comprise several segments that are interconnected by means of articulations 120, 121 and 122 so that the robot arm can grip, hold and/or process various positions of the components. Furthermore, the robot arms 105, 106, 107 and 108 can also be designed to process individual fuselage components together, e.g. to interconnect them. To this effect corresponding tools, for example welding tools or riveting tools, can be attached to the ends of the robot arms. For example, the tools at the ends of the robot arms can be exchanged for a particular task, or they can be automatically exchanged.

Furthermore, for mounting a lower fuselage shell segment 131 the fuselage manufacturing station can comprise a holding tool 127 so that the lower fuselage shell segment 131 can be positioned and mounted at a particular position.

Figure 2:
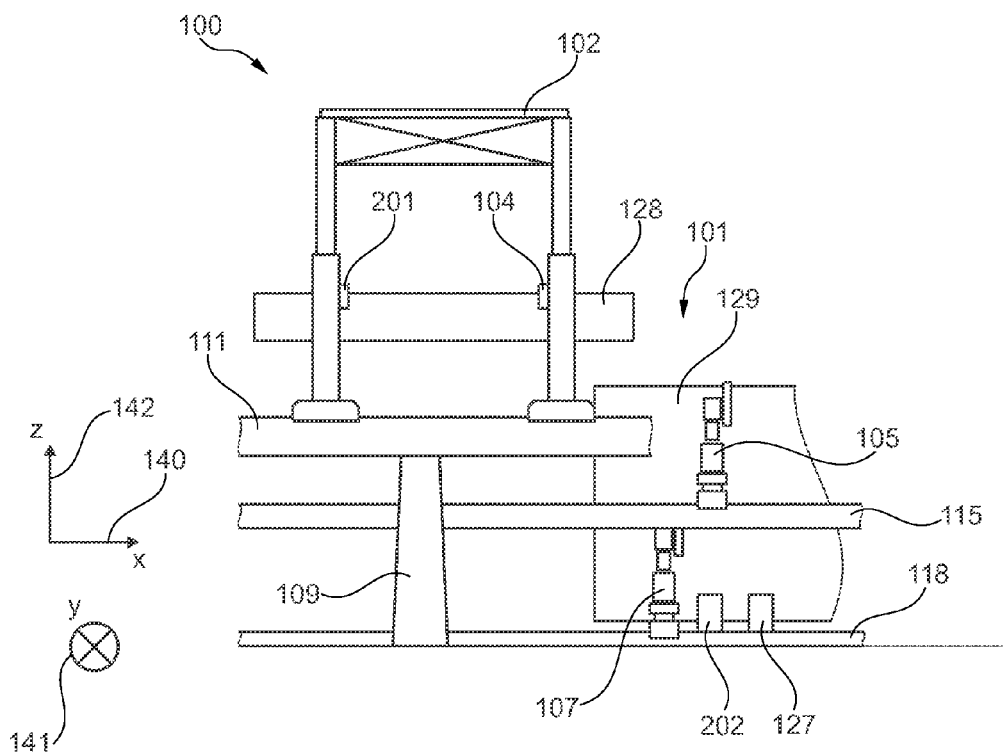
FIG. 2 shows a fuselage manufacturing station according to an exemplary embodiment of the invention.

FIG. 2 shows a lateral view of a fuselage manufacturing station 100 according to one exemplary embodiment of the invention. This arrangement can, for example, show a lateral view of the fuselage manufacturing station 100 shown in FIG. 1. FIG. 2 shows the left-hand support 109 to which the rails 111 and 115 are attached. Furthermore, the diagram shows the rail 118 that is arranged on the floor of the fuselage manufacturing station. On the rail 111 a gantry crane 102 is attached so as to be slideable in the X-direction 140. In this arrangement the gantry crane 102 comprises two gripping or holding tools 104 and 201 that by way of a lifting mechanism are height-adjustable in the z-direction 142. By means of the gantry crane 102 it is possible, for example, to transport and position an upper fuselage shell segment 128.

On the rails 115 and 118 in each case robot arms 105 and 107 are attached that are displaceable in the x-direction 140 along the rail 115 or 118. By means of these robot arms it is possible, for example, to transport and position a lateral fuselage shell segment 129. Furthermore, lower retaining means 127 and 202 are shown, on which, for example, a lower fuselage shell segment can be mounted.

Figure 3A:
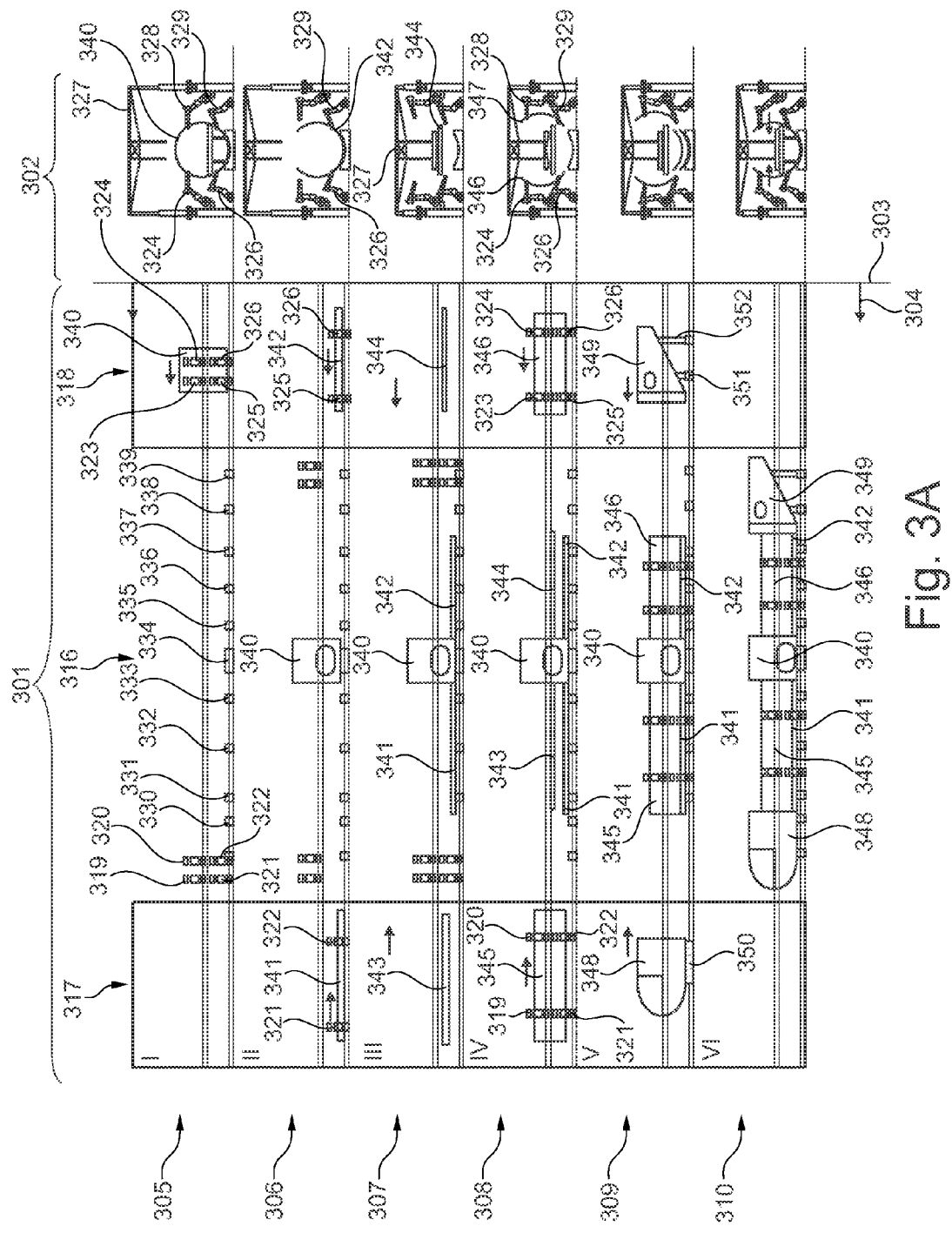
FIG. 3A shows a method for the assembly of an aircraft fuselage according to an exemplary embodiment of the invention.
Figure 3B:
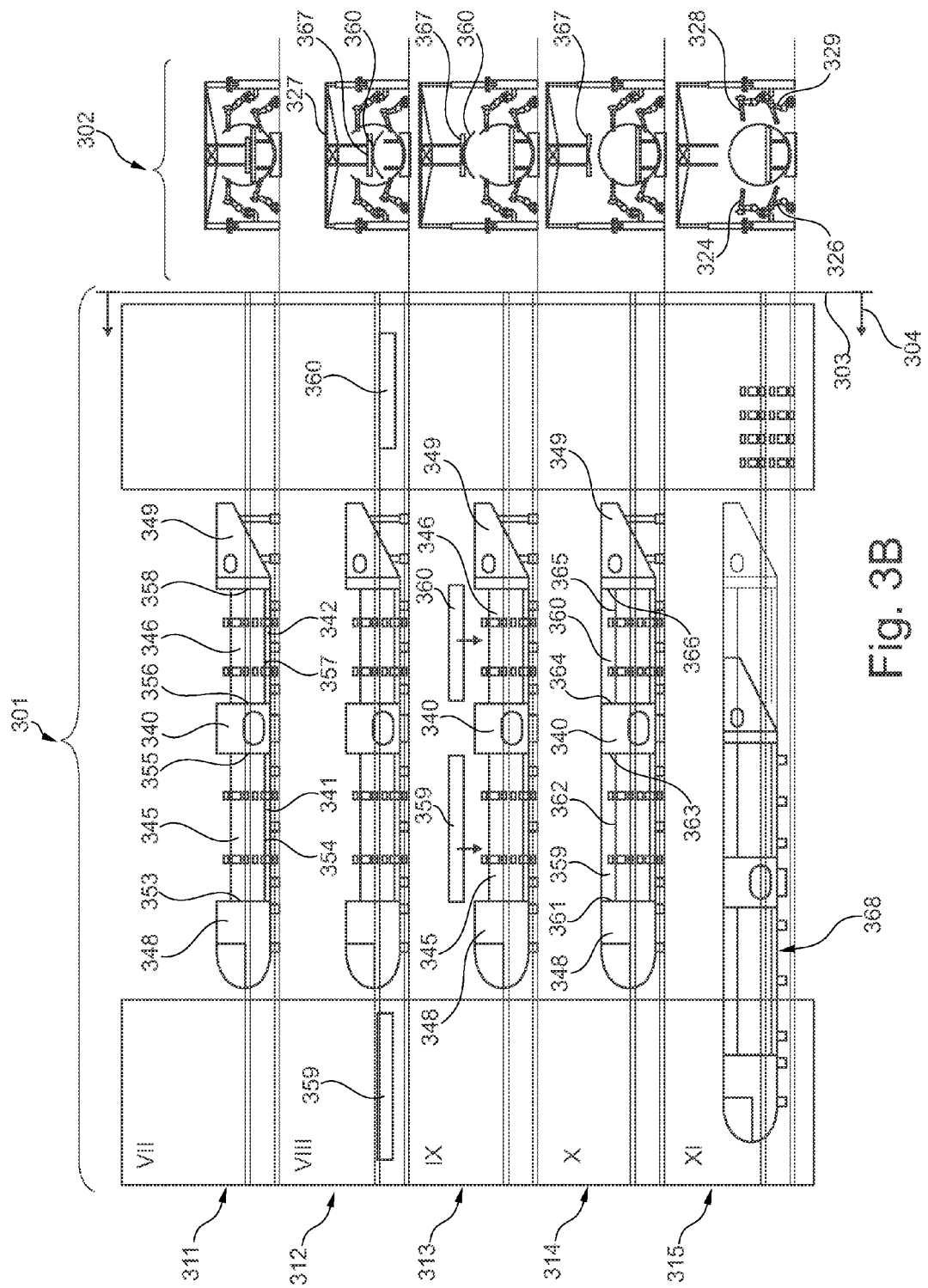
FIG. 3B shows a method for the assembly of an aircraft fuselage according to an exemplary embodiment of the invention.

FIGS. 3A and 3B show individual steps of a method for the assembly of an aircraft fuselage by means of a fuselage manufacturing station according to one exemplary embodiment of the invention. In this arrangement in the region 301 of FIGS. 3A and 3B in each case a lateral view of the fuselage manufacturing station is shown, and in section 302 of FIGS. 3A and 3B in each case a cross section of the fuselage manufacturing station is shown. Section 302 shows a cross section of the cross-sectional plane 303 with direction of view 304. In lines 305, 306, 307, 308, 309, 310, 311, 312, 313, 314 and 315 individual steps of the method are shown.

In the first line 305 a first step of the method is shown. The fuselage manufacturing station by means of which this method is implemented comprises an assembly region 316, a front pickup region 317, and a rear pickup region 318. On the left-hand side of the fuselage manufacturing station left-hand robot arms 319, 320, 321, 322, 323, 324, 325 and 326 are arranged by means of which it is possible to transport and position fuselage components. On the right-hand side of the fuselage manufacturing station right-hand robot arms are arranged (not shown in the lateral view). The cross section 302 shows that on the right-hand side robot arms 328 and 329 are arranged. On the right-hand side of the assembly region further robot arms (not shown because of the cross section) can be arranged behind the robot arms 328 and 329. Furthermore, the fuselage manufacturing station comprises a gantry crane 327 for transporting upper fuselage components. Moreover, in the assembly region 316 of the fuselage manufacturing station various retaining means 330 to 339 are arranged on which lower fuselage shell segments, a wing box, a cockpit and a tail unit can be mounted.

In the first step of the method 305 positioning of a pre-assembled wing box 340 in the assembly region 316 of the fuselage manufacturing station takes place. In this arrangement the wing box in the rear pickup region 318 is gripped by the left-hand robot arms 323-326 and by the right-hand robot arms 328 and 329 and is moved in the direction of the assembly region 316. As an alternative, the wing box 340 can also be transported from the front pickup region 317 to the assembly region 316.

In the second step of the method 306 the wing box is positioned in the middle of the assembly region 316. This is followed by positioning the front lower fuselage shell segment 341 on a front connecting region of the wing box 340, and by positioning the rear lower fuselage shell segment 342 on a rear connecting region of the wing box 340. In this arrangement in the front pickup region 317 the front lower fuselage shell segment 341 is gripped by the left-hand robot arms 321 and 322 and by right-hand robot arms (not shown) and is transported in the direction of the assembly region 316. In the rear pickup region 318 the lower rear fuselage shell segment 342 is gripped by the left-hand robot arms 325 and 326, and by the right-hand robot arm 329, and possibly by a further robot arm (not shown) and is transported in the direction of the assembly region 316.

In the third step of the method 307 positioning the front floor structure 343 on the front connecting region of the wing box 340 takes place, and positioning of the rear floor structure 344 on the rear connecting region of the wing box 340 takes place. To this effect the front floor structure 343 is gripped in the front pickup region 317 by means of a gantry crane and is moved in the direction of the assembly region. Likewise, the rear floor structure 344 is gripped in the rear pickup region 318 by the gantry crane 327 and is moved in the direction of the assembly region 316.

In the fourth step 308 of the method positioning of lateral fuselage shell segments in the assembly region 316 takes place. In this arrangement the diagram shows in lateral view that a left-hand front fuselage shell segment 345 is gripped in the front pickup region 317 by the robot arms 319-322 and is moved in the direction of the assembly region. Likewise, in the rear pickup region 318 a left-hand rear fuselage shell segment 346 is gripped by the robot arms 323-326 and is moved in the direction of the assembly region 316. The cross-sectional view 302 shows that in the rear pickup region 318, likewise, a right-hand rear fuselage shell segment 347 is gripped by means of robot arms 328 and 329. Likewise, a right-hand front fuselage shell segment can be gripped by robot arms and can be transported in the direction of the assembly region (not shown because of the cross section depicted).

In the fifth step 309 of the method positioning the cockpit 348 and the tail unit 349 takes place. In this arrangement the cockpit 348 is moved from the front pickup region 317 in the direction of the assembly region 316 by means of a guiding means 350. Likewise, the pre-assembled tail unit 349 is moved from the pickup region 318 with the use of guiding means 351 and 352 in the direction of the assembly region 316.

In the sixth step 310 of the method the lateral fuselage shell segments are moved from the pre-assembly position to the assembly position so that the individual fuselage components can be interconnected.

FIG. 3B shows the steps 7 to 11 of the method. In the seventh step 311 connecting the various components takes place. Thus the front connecting region 355 of the wing box 340 is joined to the front fuselage shell segments 345 and 341. Furthermore, the front fuselage shell segments 345 and 341 on the adjoining region 354 are interconnected and are joined to the connecting region 353 of the cockpit 348. Likewise, the wing box 340 is joined to the rear fuselage shell segments 346 and 342 by way of the rear connecting region 354. The rear fuselage shell segments 346 and 347 are interconnected on the connecting region 357. Furthermore, the rear fuselage shell segments are joined to the connecting region 358 of the tail unit 349. In this arrangement the term "joining" can refer to riveting or welding of the individual components.

In the eighth step of the method 312, positioning the upper fuselage shell segments 359 and 360 takes place. In this arrangement the front upper fuselage shell segment 359 is gripped from the front pickup region 317 and is transported in the direction of the assembly region 316. Likewise, the rear upper fuselage shell segment 360 in the rear pickup region 318 is gripped by the holding or gripping tool 367 of the gantry crane 327 and is moved in the direction of the assembly region 316.

In the ninth step of the method 313, positioning the upper fuselage shell segments 359 and 360 takes place. In this arrangement the upper fuselage shell segments 359 and 360 are moved to the correct horizontal position, by means of the gantry crane or gantry cranes, and are subsequently lowered so that the upper opening of the cockpit is closed by the upper fuselage shell segments.

In the tenth step 314 of the method, joining the upper fuselage shell segments to the adjacent components of the fuselage takes place. Thus the front upper fuselage shell segment 359 is joined on the joint 363 to the wing box 340, on the joint 362 to the front lateral fuselage shell segment, and on the joint 361 to the cockpit 348. Likewise, the rear upper fuselage shell segment 360 is joined on the joint 364 to the wing box 340, on the joint 365 to the lateral rear fuselage shell segment 346, and on the joint 366 to the tail unit 349. Furthermore, the holding or gripping tool of the gantry crane 327 is raised by means of the lifting mechanism.

In the eleventh step of the method 315 the robot arms 324, 326, 328 and 329, and also the robot arms that are not shown, are removed from the aircraft fuselage 368 so that the aircraft fuselage can be moved out of the fuselage manufacturing station.

Figure 4A:
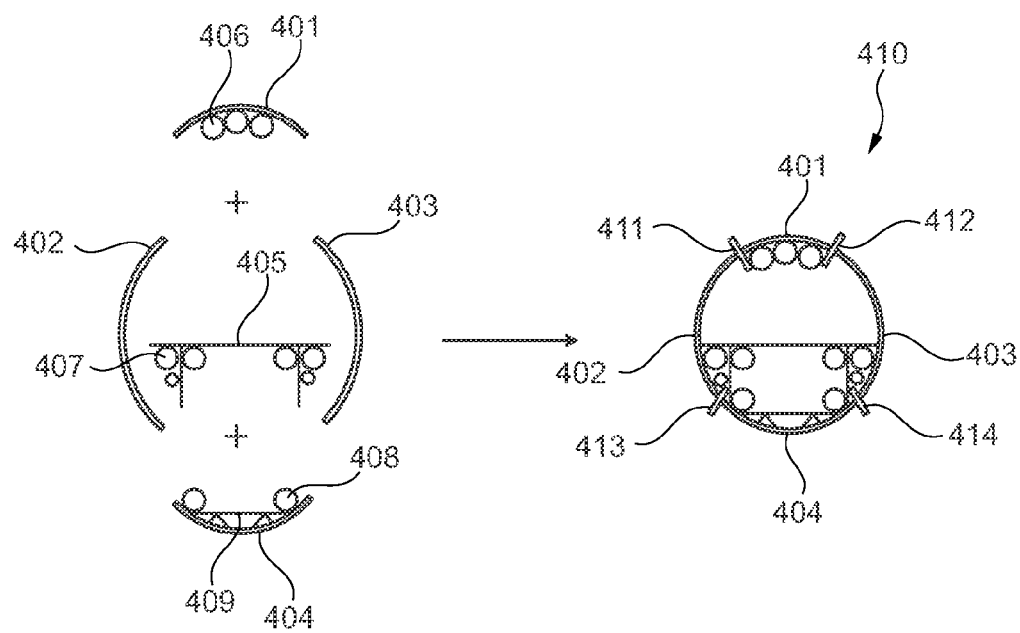
FIG. 4A shows a construction kit for the production of an aircraft fuselage according to an exemplary embodiment of the invention.

FIG. 4A shows a cross section of an aircraft fuselage in the four-shell construction according to one exemplary embodiment of the invention. In this arrangement the left-hand half of FIG. 4A shows that the aircraft fuselage 410 can be constructed from four pre-fabricated fuselage shell segments. Thus the aircraft fuselage comprises an upper fuselage shell segment 401, lateral fuselage shell segments 402 and 403, and a lower fuselage shell segment 404. The fuselage shell segments 401-404 are pre-fabricated, in other words the upper fuselage shell segment already comprises pipes and lines 406, the lateral fuselage shell segments 402 and 403 already comprise pipes and lines 407, and the lower fuselage shell segment already comprises pipes 408. Furthermore, a floor structure 405 is attached between the lateral fuselage shell segments, and the lower fuselage shell segment 404 comprises an additional reinforcement structure 409. The right-hand half of the diagram of FIG. 4A shows the four fuselage shell segments 401-404 in the assembled configuration. In this arrangement, between the fuselage shell segments 401 and 402 there is the joint 411, between the fuselage shell segments 402 and 404 there is the joint 413, between the fuselage shell segments 404 and 403 there is the joint 414, and between the fuselage shell segments 403 and 401 there is the joint 412.

Figure 4B:
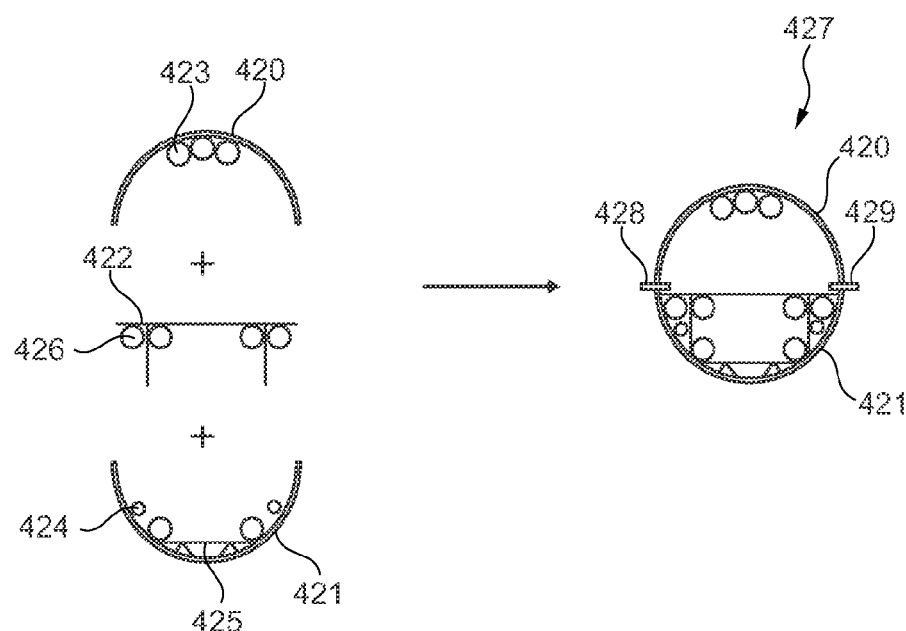
FIG. 4B shows a construction kit for the production of an aircraft fuselage according to an exemplary embodiment of the invention.

FIG. 4B shows an aircraft fuselage 427, which has been constructed in the half-shell construction, according to one exemplary embodiment of the invention. The left-hand half of the diagram of FIG. 4B shows that the aircraft fuselage 427 is constructed from an upper fuselage shell segment 420 with equipment elements 423 and from a lower fuselage shell segment 421 with equipment elements 424. Furthermore, between the fuselage shell segments 420 and 421 a floor structure 422 is arranged that also comprises equipment elements 426. Furthermore, the lower fuselage shell segment 421 also comprises a reinforcement structure 425.

The right-hand half of the diagram of FIG. 4B shows the aircraft fuselage 427 in half-shell construction in the assembled configuration. In this arrangement the joints 428 and 429 are located between the fuselage shell segments 420 and 421.

Figure 5:
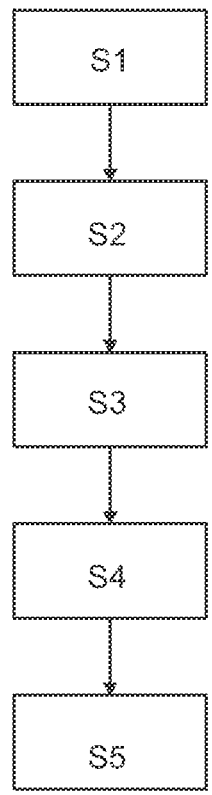
FIG. 5 shows a flow chart according to an exemplary embodiment of the invention.

FIG. 5 shows a flow chart for a method for the assembly of an aircraft fuselage with a fuselage manufacturing station according to one exemplary embodiment of the invention. The method comprises the step S1 of providing a pre-assembled wing box that comprises a front connecting region for connecting front fuselage shell segments and a rear connecting region for connecting rear fuselage shell segments, a pre-assembled cockpit unit, a pre-assembled tail unit, and a plurality of pre-fabricated front and rear fuselage shell segments. Furthermore, the method involves the step S2 of positioning the wing box, the cockpit unit and the tail unit in an assembly region of the fuselage manufacturing station. The method further comprises the step S3 of positioning a first front fuselage shell segment on the front connecting region of the wing box, and the step S4 of positioning a first rear fuselage shell segment on the rear connecting region of the wing box. Furthermore, according to the method the step S5 of joining the first front fuselage shell segment to a second front fuselage shell segment, and the step S6 of joining the first rear fuselage shell segment to a second rear fuselage shell segment take place.

In this arrangement the steps of the method can be carried out in any desired order. The sequence shown in FIG. 5 is provided as an example only; it is not limiting.

Figure 6A:
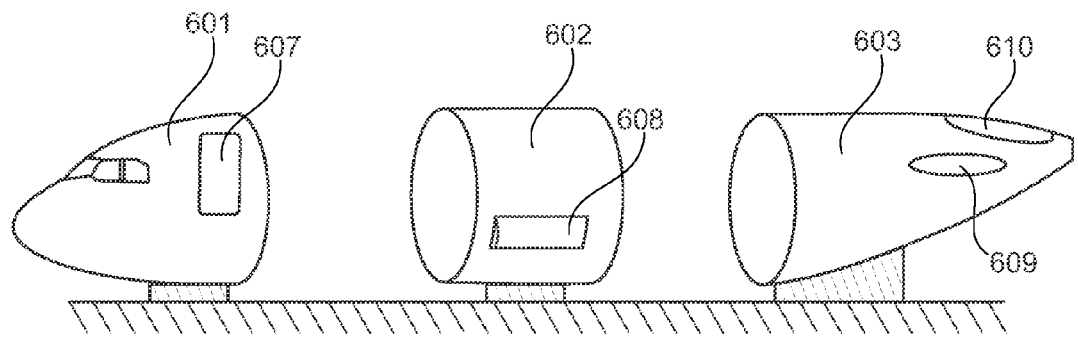
FIG. 6A shows the assembly of an aircraft fuselage according to an exemplary embodiment of the invention.
Figure 6B:
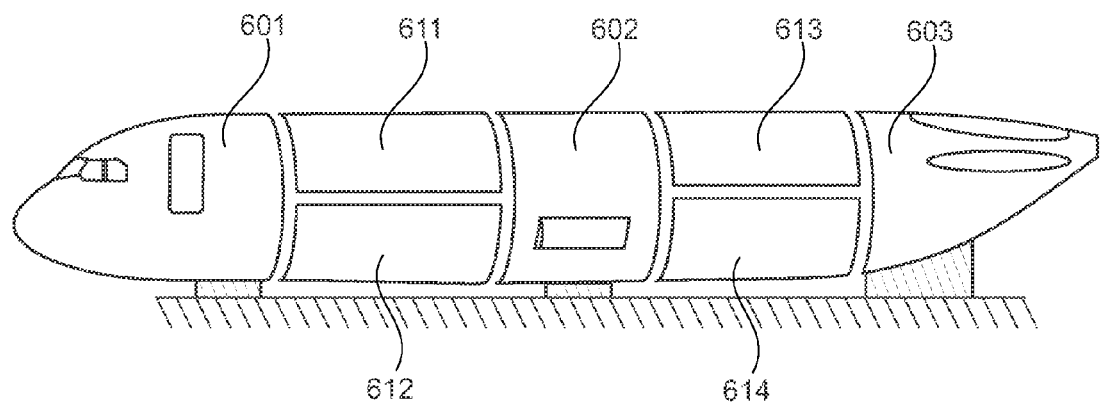
FIG. 6B shows the assembly of an aircraft fuselage according to an exemplary embodiment of the invention.

FIGS. 6A and 6B show the assembly or manufacture of an aircraft fuselage according to one exemplary embodiment of the invention. FIG. 6A shows that first a pre-assembled cockpit unit 601, a pre-assembled wing box 602 and a pre-assembled tail unit 603 are positioned relative to each other. In this arrangement the cockpit unit 601, the wing box 602 and the tail unit can be positioned in such a manner as they will ultimately be positioned in the finished aircraft fuselage.

FIG. 6B shows that following positioning of the cockpit unit 601, of the wing box 602 and of the tail unit 603 the fuselage shell segments 611, 612, 613 and 614 are positioned on the cockpit unit 601, the wing box 602 and the tail unit 603. In this arrangement the fuselage shell segments 611 and 612 are positioned between the cockpit unit 601 and the wing box 602 and are connected to them. The fuselage shell segments 613 and 614 are positioned between the wing box 602 and the tail unit 603 and are connected to them.

According to a further exemplary embodiment of the invention, a pre-assembled cockpit unit C, a pre-assembled tail unit H, a pre-assembled wing box F, and several fuselage shell segments can comprise equipment elements or functional elements according to the following table. In this arrangement the aircraft fuselage is constructed in a four-shell construction and comprises an upper fuselage shell segment OS, a left-hand fuselage shell segment LS, a right-hand fuselage shell segment RS and a lower fuselage shell segment US. Furthermore, a pre-fabricated floor structure FS is provided.

| Equipment element/ functional element | C | F | H | OS | LS | RS | US | FS |
|---|---|---|---|---|---|---|---|---|
| Lining | X | X | X | X | $X^3$ | $X^3$ | $X^3$ | |
| Electrical systems | X | X | X | $X^1$ | $X^1$ | $X^1$ | $X^1$ | $X^1$ |
| Hydraulic systems | X | X | X | \ | \ | \ | X | X |
| Mechanical systems | X | X | X | $X^2$ | | | X | X |
| Mounting devices/ clamps | X | X | X | X | X | X | X | X |
| Insulation | X | X | X | X | X | X | X | \ |
| Surface treatment | X | X | X | X | X | X | X | X |

In this arrangement the symbol "X" denotes that pre-fabrication or pre-furnishing of the component listed in the corresponding column with the element listed in the corresponding line is entirely or partly provided. The symbol "\" denotes that according to this exemplary embodiment pre-fabrication or pre-furnishing of the respective component with the respective element is not required. Superscript "1" denotes that electrical cables are provided, for example, rolled up on a cable reel in the cockpit unit or in the wing box. Superscript "2" denotes that mechanical systems, e.g. air pipes, can be pre-installed or integrated in the structure of the fuselage shell segment. Superscript "3" denotes that beneath the floor structure some other lining is provided. Thus above the floor structure a cabin lining is provided, and beneath the floor structure a cargo lining is provided. In this arrangement, according to this exemplary embodiment, the mechanical systems are preferably provided in the upper and lower fuselage shell segments and in the floor structure. Furthermore, in the cockpit unit a galley monument is temporarily stored, and in the wing box a lavatory monument is temporarily stored. Once the fuselage structure has been assembled, the aforesaid can be installed at their final positions.

In addition, it should be pointed out that "comprising" does not exclude other elements or steps, and "a" or "one"

does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A method for the assembly of an aircraft fuselage with a fuselage manufacturing station, the method comprising:
   providing a pre-assembled wing box comprising a front connecting region configured to connect front fuselage shell segments, and a rear connecting region configured to connect rear fuselage shell segments, a pre-assembled cockpit unit, a pre-assembled tail unit, and a plurality of pre-fabricated front and rear fuselage shell segments;
   positioning the wing box, the cockpit unit and the tail unit in an assembly region of the fuselage manufacturing station;
   positioning a first front fuselage shell segment on the front connecting region of the wing box;
   positioning a first rear fuselage shell segment on the rear connecting region of the wing box;
   joining the first front fuselage shell segment to a second front fuselage shell segment; and
   joining the first rear fuselage shell segment to a second rear fuselage shell segment.

2. The method of claim 1, further comprising:
   joining the first and the second front fuselage shell segments to the front connecting region of the wing box;
   joining the cockpit unit to an adjacent front fuselage shell segment;
   joining the first and the second rear fuselage shell segments to the rear connecting region of the wing box; and
   joining the tail unit to an adjacent rear fuselage shell segment.

3. The method of claim 1, further comprising:
   positioning a front floor structure on the front connecting region of the wing box;
   positioning a rear floor structure on the rear connecting region of the wing box;
   joining the front floor structure to a front fuselage shell segment; and
   joining the rear floor structure to a rear fuselage shell segment.

4. The method of claim 1, further comprising:
   positioning the second front fuselage shell segment, a third front fuselage shell segment and a fourth front fuselage shell segment on the front connecting region of the wing box;
   positioning the second rear fuselage shell segment, a third rear fuselage shell segment and a fourth rear fuselage shell segment on the rear connecting region of the wing box;
   joining the front fuselage shell segments to adjacent front fuselage shell segments;
   joining the front fuselage shell segments to the wing box and to the cockpit unit;
   joining the rear fuselage shell segments to adjacent rear fuselage shell segments; and
   joining the rear fuselage shell segments to the wing box and to the tail unit;
   wherein the first front fuselage shell segment and the first rear fuselage shell segment are in each case lower fuselage shell segments;
   wherein the second front fuselage shell segment and the third front fuselage shell segment, and the second rear fuselage shell segment and the third rear fuselage shell segment are in each case lateral fuselage shell segments; and
   wherein the fourth front fuselage shell segment and the fourth rear fuselage shell segment are in each case upper fuselage shell segments.

5. The method of claim 1,
   wherein the first front fuselage shell segment and the first rear fuselage shell segment are in each case lower fuselage shell segments; and
   wherein the second front fuselage shell segment and the second rear fuselage shell segment are in each case upper fuselage shell segments.

6. The method of claim 1, wherein each step of joining involves at least one of welding, friction welding, riveting, bonding, plugging together, screwing.

7. The method of claim 1, wherein providing the pre-fabricated fuselage shell segments comprises equipping fuselage shell segments with an element from the group comprising surface protection, insulation, mounting devices, electronics components, hydraulics components, fiber optic lines, wireless modules, air conditioning components, fuel components, bleed-air components, and fuel cell components.

8. The method of claim 1, wherein during positioning, the pre-assembled cockpit, the pre-assembled wing box, the pre-assembled tail unit and the pre-fabricated fuselage shell segments are in each case transported from a front pickup region or a rear pickup region of the fuselage manufacturing station to the assembly region of the fuselage manufacturing station.

9. A fuselage manufacturing station for the assembly of an aircraft fuselage, the fuselage manufacturing station comprising:
   an assembly region configured to assemble the aircraft fuselage;
   a transport and positioning device configured to transport and position individual components, which are to be installed, of the aircraft fuselage; and
   a joining device configured to establish a joint between components of the aircraft fuselage;
   wherein the transport and positioning device is configured to position a pre-assembled wing box comprising a front connecting region for connecting front fuselage shell segments, and a rear connecting region for connecting rear fuselage shell segments, a pre-assembled cockpit unit and a pre-assembled tail unit in an assembly region of the fuselage manufacturing station;
   wherein the transport and positioning device is configured to position a first pre-fabricated front fuselage shell segment on the front connecting region of the wing box;
   wherein the transport and positioning device is configured to position a first pre-fabricated rear fuselage shell segment on the rear connecting region of the wing box;
   wherein the joining device is configured to join the first front fuselage shell segment to a second pre-fabricated front fuselage shell segment; and
   wherein the joining device is configured to join the first rear fuselage shell segment to a second pre-fabricated rear fuselage shell segment.

10. The fuselage manufacturing station of claim 9,
wherein the joining device is configured to join the first front fuselage shell segment to the wing box;
wherein the joining device is configured to join the cockpit unit to an adjacent front fuselage shell segment;
wherein the joining device is configured to join the first rear fuselage shell segment to the wing box; and
wherein the joining device is configured to join the tail unit to an adjacent rear fuselage shell segment.

11. The fuselage manufacturing station of claim 9,
wherein for accommodating the aircraft fuselage the assembly region comprises an elongated design;
wherein on a front end of the assembly region a front pickup region is arranged, and/or on a rear end of the assembly region a rear pickup region are/is arranged for picking up components of the fuselage that are to be installed; and
wherein the transport and positioning device is designed for transporting components from the front pickup region and/or from the rear pickup region to the assembly region.

12. The fuselage manufacturing station of claim 9,
wherein for accommodating an aircraft fuselage the assembly space is elongated in a longitudinal direction and comprises a left-hand delimitation and a right-hand delimitation which are arranged so as to be parallel to the longitudinal direction;
wherein a left-hand transport and positioning device and a left-hand joining device are arranged on the left-hand delimitation of the assembly space; and
wherein a right-hand transport and positioning device and a right-hand joining device are arranged on the right-hand delimitation of the assembly space;
so that the aircraft fuselage can be assembled simultaneously from the left-hand side and from the right-hand side.

13. The fuselage manufacturing station of claim 9, further comprising:
an upper transport and positioning device for transporting a floor structure;
wherein the upper transport and positioning device is configured to position a front floor structure on the front connecting region of the wing box;
wherein the upper transport and positioning device is configured to transport a rear floor structure on the rear connecting region of the wing box;
wherein the joining device is configured to join the front floor structure to a front fuselage shell segment; and
wherein the joining device is configured to join the second floor structure to a rear fuselage shell segment.

14. The fuselage manufacturing station of claim 13,
wherein the transport and positioning device and the joining device are designed in the form of a multifunctional robot; and
wherein the upper transport and positioning device is designed as a gantry crane.

15. A construction kit for the production of an aircraft fuselage, with the aircraft fuselage comprising:
a pre-assembled cockpit unit comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, lavatories, galleys, hatracks, carpets, seats, auxiliary power units and any combination thereof; and/or
a pre-assembled wing box comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, lavatories, galleys, hatracks, carpets, seats, auxiliary power units and any combination thereof; and/or
a pre-assembled tail unit comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, lavatories, galleys, hatracks, carpets, seats, auxiliary power units and any combination thereof; and
a plurality of separate, pre-fabricated fuselage shell segments, a pre-fabricated fuselage shell segment in each case comprising at least one equipment element selected from the group comprising surface protection, insulation, mounting devices, electronics components, hydraulics components, fiber optic lines, wireless modules, air conditioning components, fuel components, bleed-air components, fuel cell components, lining elements, interior fitting components, hatracks, auxiliary power units and any combination thereof.

* * * * *